March 9, 1937.  C. A. BREWER  2,072,999
CONTROL MEANS FOR MOTOR VEHICLES
Filed Dec. 17, 1934   2 Sheets-Sheet 1
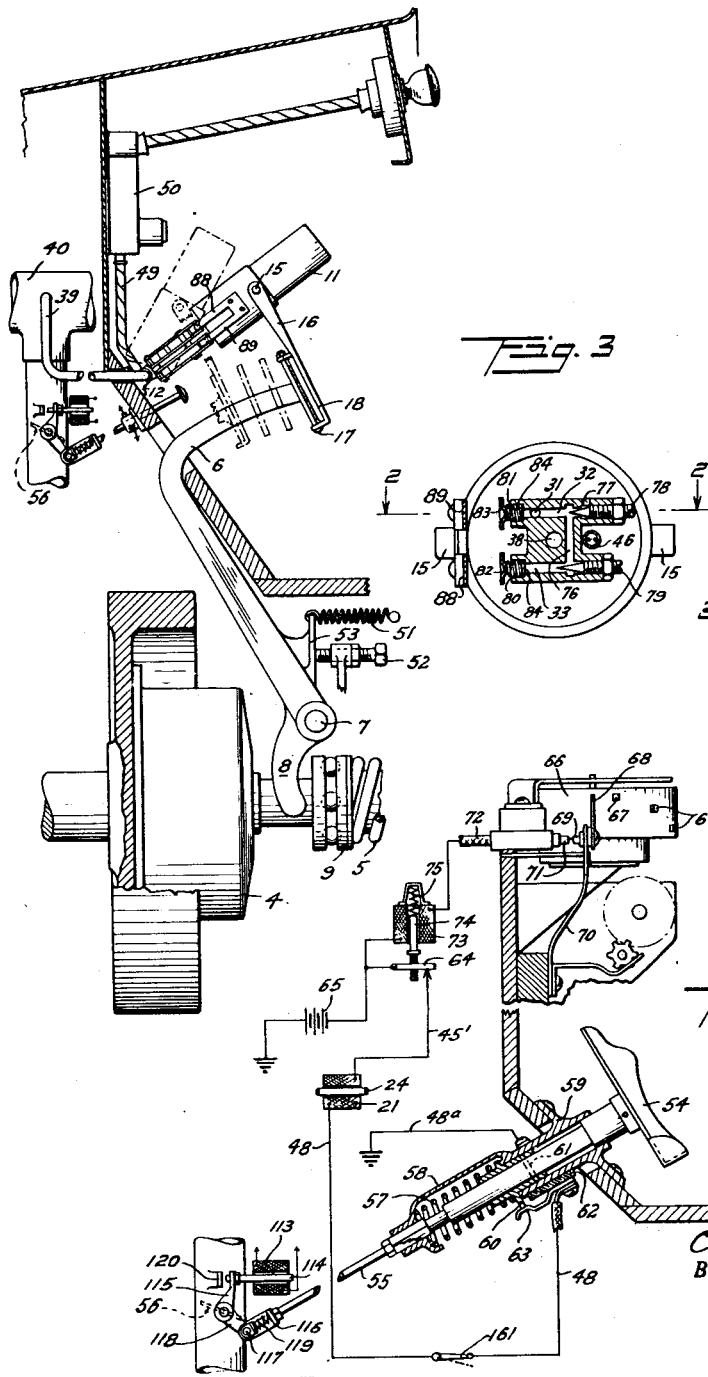
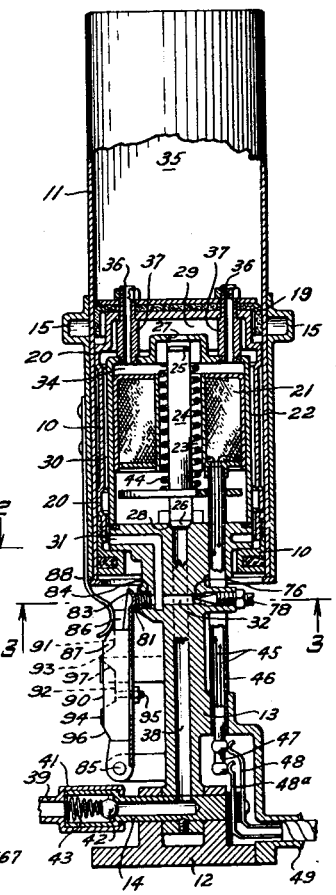
INVENTOR.
Charles A. Brewer
BY H. Q. Clayton
ATTORNEY March 9, 1937.  C. A. BREWER  2,072,999
CONTROL MEANS FOR MOTOR VEHICLES
Filed Dec. 17, 1934    2 Sheets-Sheet 2
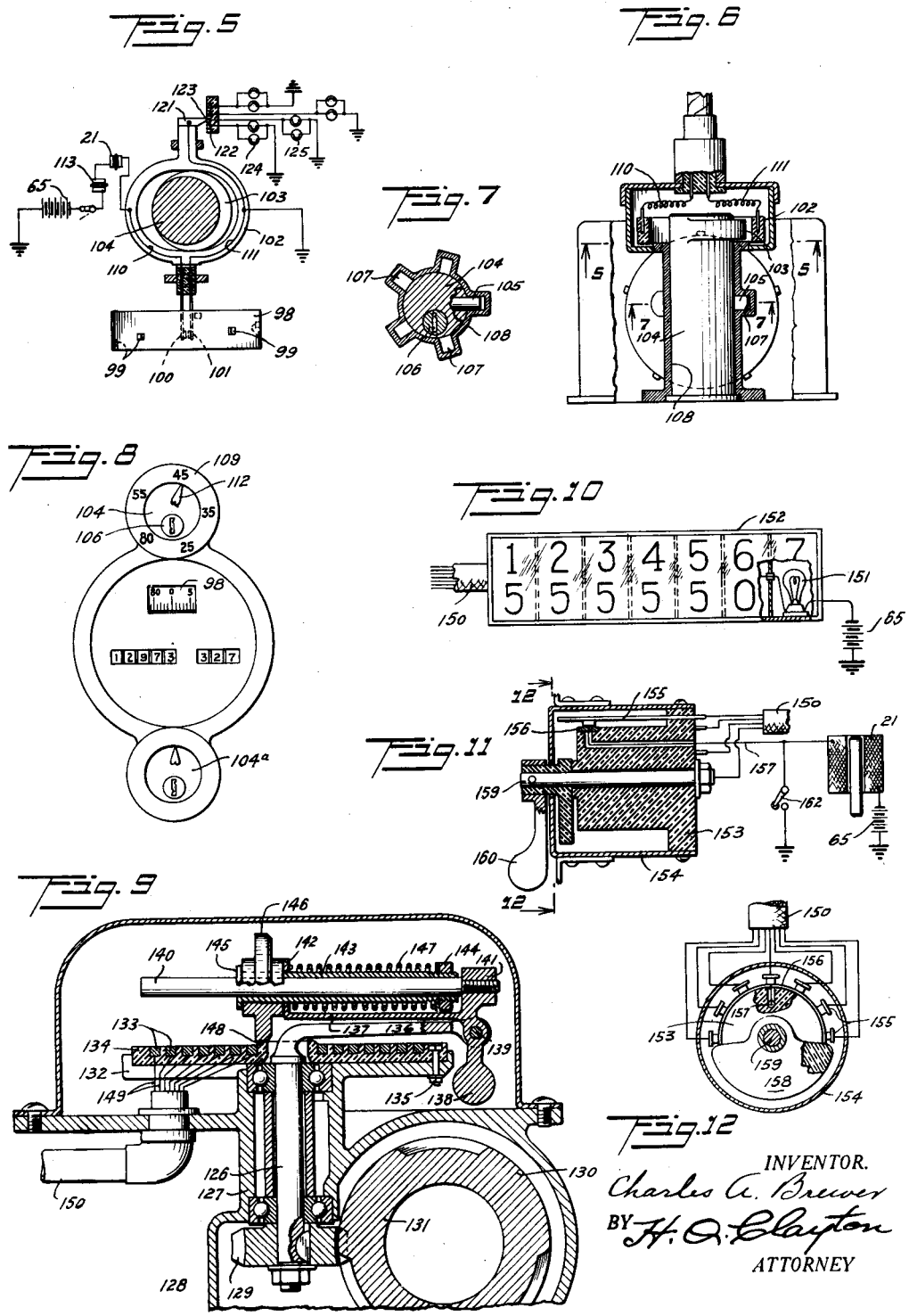

Patented Mar. 9, 1937

2,072,999

UNITED STATES PATENT OFFICE 2,072,999

CONTROL MEANS FOR MOTOR VEHICLES

Charles A. Brewer, Noroton Heights, Conn., assignor of one-half to Philip J. Kury, Arverne, N. Y.

Application December 17, 1934, Serial No. 757,774

13 Claims. (Cl. 192—.01)

This invention relates to motor vehicles and more particularly to combined speed indicating and control means for such vehicles whereby safety in operation and ease of control are materially enhanced.

This application constitutes a continuation in part of my application Serial No. 396,691 for Safety control system for motor vehicles, filed October 2, 1929.

One of the objects of the present invention is to provide novel means for controlling the power actuation of the clutch mechanism of a motor vehicle, whereby safety is promoted, wear and tear on the vehicle is reduced, more uniform operation and control are attained, starting strains are reduced, and fatigue of the operator is materially lessened.

Another object of the invention is to provide novel means for indicating and controlling the speed of a motor vehicle.

Still another object is to provide novel control means for a motor vehicle whereby the clutch mechanism thereof may be automatically disengaged at a predetermined vehicle speed, either to prevent operation of the vehicle above a selected maximum speed or to prevent disengagement of the clutch when the vehicle is operating above a predetermined speed.

A further object of the invention is to provide novel means responsive to the speed of the vehicle for indicating said speed or for controlling signals operative at pre-selected speeds to indicate to the driver and to a traffic officer when said speeds are reached or exceeded.

A still further object is to provide novel means in combination with a power actuated clutch whereby the throttle will be automatically closed whenever the clutch is disengaged, thereby eliminating racing of the motor.

The above and further objects and novel features of this invention will more fully appear from the following detailed description taken in connection with the accompanying drawings. It is to be expressly understood, however, that the drawings are for the purpose of illustration only and are not designed as a definition of the limits of the invention, reference being primarily had for this latter purpose to the appended claims.

In the drawings, wherein like reference characters refer to like parts throughout the several views:

Fig. 1 is a somewhat diagrammatic elevation of portions of a vehicle, partly in section and with parts broken away, illustrating one form of power device for operating the vehicle clutch, which device may be employed in carrying out the present invention;

Fig. 2 is a sectional detail view with parts broken away of the power unit shown in Fig. 1, a portion of which is taken on line 2—2 of Fig. 3;

Fig. 3 is a cross section taken substantially on line 3—3 of Fig. 2;

Fig. 4 is a diagrammatic elevation of one form of control circuit for the clutch operating means shown in Figs. 1 and 2;

Fig. 5 is a diagrammatic view illustrating another form of control device including a speedometer whereby operation of the vehicle at excessive speeds is prevented, the view of the cam mechanism being taken substantially on line 5—5 of Fig. 6;

Fig. 6 is a top plan, partly in section and with parts broken away, of the control mechanism of Fig. 5;

Fig. 7 is a section taken on line 7—7 of Fig. 6;

Fig. 8 is a front elevation of the mechanism of Fig. 6;

Fig. 9 is a front elevation, partly in section and with parts broken away, of a novel speed responsive device which may be employed in carrying out the invention;

Fig. 10 is a front elevation of an illuminated speed indicating panel;

Fig. 11 is a side elevation, partly in section and with parts broken away, of a novel switch mechanism adapted for use with the device of Fig. 9; and Fig. 12 is a sectional view taken substantially on line 12—12 of Fig. 11, some parts being broken away.

One form of clutch operating mechanism which may be employed in carrying out the present invention is illustrated in Figs. 1 to 3 inclusive wherein the clutch 4 of a motor vehicle, normally held in operative engaged position by a spring 5, is adapted to be moved to disengaged position by the depression of a clutch pedal 6 of the type ordinarily provided for manual actuation of the clutch mechanism. Pedal 6 is pivotally mounted at 7 and is provided with a bifurcated portion 8 which is adapted to engage a bearing 9 for disengaging the clutch mechanism. A power device of the fluid pressure vacuum actuated type is provided for operating the clutch mechanism, said device being preferably attached directly to clutch pedal 6.

The power device comprises two relatively movable elements, in the present case a piston element 10 and a cylinder 11 enclosing the piston, either of which may be movable. In the embodiment shown, the piston represents the stationary element and the cylinder is moved relative thereto in a manner and for a purpose to appear hereafter. A bracket 12 is mounted on the foot board 5 of the vehicle adjacent pedal 6 for supporting the power device. Preferably a stem 13 is connected at its upper end to piston 10 and is pivotally connected at its lower end to bracket 12 by any suitable means such as a pivot pin 14. Cylinder 11 carries trunnions 15 adapted for pivotal connection with a bracket arm 16, which may be clamped by any suitable means, as by bolts 17, to the head or foot rest 18 of clutch pedal 6. Therefore, as the cylinder moves, the clutch will be correspondingly shifted, the pivotal connections 14 and 16 permitting the power device to swing to compensate for the arcuate movement of head 18 about the pedal pivot 7.

The power device in the present instance is operated by suction from any suitable device, such, for example, as the intake manifold of the vehicle motor, and it is shown as electrically controlled although it can be manually or mechanically controlled. Piston 10 may carry the usual cup leather 19 to prevent leakage past the piston and it is guided in the cylinder by the annular walls 20. This piston also carries the control mechanism for the power device, said control mechanism comprising a solenoid 21 mounted in a casing 22 in the piston and having a central opening 23 through which extends an armature 24 having valves 25 and 26 at its opposite ends to control openings 27 and 28 respectively. Opening 27 is in the top wall of casing 22 and communicates with space 29 which in turn is normally in communication with the atmosphere through annular space 30, passage 31 in piston 10, and a pair of branch passages 32 and 33 (Fig. 3). The space 34 within casing 22 communicates with the space 35 in cylinder 11 above piston 10 through a plurality of passages 36 in the connecting and spacing bolts 37.

The opening 28 and valve 26 control communication from space 34 and passage 23 to a passage 38 extending longitudinally in stem 13 of piston 10, the latter passage being in constant communication with the hollow center portion of pivot pin 14 which is in turn connected through a suitable tubular connection 39 with a source of suction, such as the intake manifold 40 (Fig. 1) of the vehicle motor. A joint 41 permits relative turning movement between conduit 39 and pivot pin 14. This joint also serves as a means for carrying a check valve of any suitable type, such as ball 42, normally held against its seat by a spring 43. As shown in Fig. 2, check valve, 42, 43 is so arranged as to permit air to flow from passage 38 to the intake manifold but to prevent flow of air in the opposite direction.

A spring 44 embraces the armature 24 and tends to shift the same downwardly to normally close valve 26, 28 and open valve 25, 27. Solenoid 21 is accordingly so constructed with relation to armature 24 that excitation thereof will raise the armature to close valve 25, 27 and open valve 26, 28. This will place passage 38 in communication with space 35 in cylinder 11 above piston 10, thus cutting said space off from communication with atmosphere and connecting the same with intake manifold 40, whereupon the air in space 35 is withdrawn through passages 36, space 23, 34, passage 38, and conduit 39. Cylinder 11 and bracket 16 are thus moved downwardly relative to piston 10 to actuate clutch pedal 6 and thereby disengage the clutch mechanism.

In order to energize solenoid 21 for the purpose above pointed out, lead wires 45 are led to the solenoid through a tube 46 attached to piston 10 and stem 13, said wires being connected at their outer ends to a suitable jack 47. The lower end of the latter is contacted by a pair of spring contacts 48 which are in turn connected to a suitable source of electrical energy through a flexible protective cable 49 and a connection box 50, said box being mounted in any suitable position where it is easily accessible and in which the desired electrical connections may be made to the various control switches to be later described.

It will of course be apparent that power device 10, 11 is normally in the full line position illustrated, i. e. with cylinder 11 in its upper position, valve 25 being open and space 35 communicating with atmosphere through space 29, 30 and passages 31 and 32. Clutch pedal 6 is thus also normally in raised position and the clutch parts in driving engagement. Upward movement of the clutch pedal and hence that of cylinder 11 under action of a suitable spring 51 is limited by an adjustable stop screw 52 carried by a stationary element of the vehicle frame and adapted to engage a lug 53 on pedal 6.

One form of novel control means for the above described power device is diagrammatically illustrated in Fig. 4 whereby power operation of the clutch mechanism is controlled in accordance with the speed of the vehicle and its motor. Such means, as illustrated, comprise an accelerator actuated switch in circuit with solenoid 21, said switch being so constructed as to be in closed or contact making position during a predetermined range of movement of the accelerator pedal near released position of the latter, i. e. when the vehicle motor is idling.

In the illustrated embodiment, an accelerator pedal 54 is connected by means of a push rod 55 with the butterfly valve 56 of the vehicle carburetor, the connection between said rod and valve being preferably by a slip link in a manner, and for a purpose, to be hereinafter described. Pedal 54 is normally held in raised position with valve 56 closed by a suitable spring 57. The latter may be interposed between a downwardly extending portion 58 of a guide member 59 in which rod 55 operates and a flanged contact sleeve 60 secured by means of a pin 61 to said rod, the flange on said sleeve serving to limit the upward movement of pedal 54. Adjustably mounted on guide member 59 and insulated therefrom by a block 62 is a spring contact 63 adapted to be engaged by contact sleeve 60 when pedal 54 is released beyond a predetermined position, depending upon the adjustment of spring 63.

Contact sleeve 60 is connected to ground through the vehicle chassis and contact 63 is connected through lead 48 to one end of the coil of solenoid 21. The other end of said coil is connected by means of a lead 45' and a normally closed switch 64 to a battery 65. Thus, when switch 64 is in closed position and pedal 54 is released, thereby engaging contacts 60 and 63, a circuit is closed through solenoid 21, whereupon the power device 10, 11 is rendered effective to release the clutch mechanism in a manner heretofore described.

In order that the compression of the vehicle motor may be employed for braking purposes when it is desired to decrease the speed of the vehicle, novel means are provided whereby the power means for actuating the clutch are rendered ineffective to release the latter when the vehicle is exceeding a predetermined speed. Such means comprise a device responsive to the speed of the vehicle and adapted to control switch 64. In the illustrated embodiment, the speed responsive device is constituted by a speedometer, the light, rotary dial 66 of which is moved in accordance with the vehicle speed in any well-known manner such as, for example, by an air current produced by the centrifugal action of a rotary pump driven from the vehicle drive shaft. The construction of the speedometer being common and well known, it is shown somewhat diagrammatically.

Movable dial 66 of the speedometer has spaced lugs 67, spaced at different heights and also at different distances around the periphery of said dial and adapted to engage a finger 68 adjustably mounted on a movable contact 69 carried by a spring 70 through which said contact is connected to ground. Contact 69 is normally held by said spring spaced from a contact 71 connected through a lead 72 to a solenoid 73, the other end of which is connected to battery 65. Armature 74 of solenoid 73 is operatively connected to the pivoted arm of switch 64 and is normally held in the position shown by a spring 75 to maintain said switch in closed position. When finger 68 is engaged by one of the lugs 67 at a predetermined vehicle speed depending upon the vertical adjustment of said finger, contacts 69 and 71 will be moved into engagement by the centrifugal forces acting upon dial 66, thereby closing a circuit through solenoid 73. Armature 74 will thereupon be attracted against the efforts of spring 75 to open switch 64, thus rendering it impossible to complete a circuit through solenoid 21 for disengaging the clutch when the vehicle is moving in excess of said predetermined speed, and this irrespective of the position of accelerator pedal 54. The power device 10, 11 is accordingly rendered ineffective to disengage the clutch until the vehicle speed is reduced to a predetermined value and the speed of the vehicle motor is reduced to idling speed by the release of the accelerator pedal.

For example, assume that the operator desires to employ the compression of the motor for braking purposes until the vehicle speed is reduced to twelve miles per hour. Finger 68 is adjusted so that the same will be engaged by one of the lugs 67 as soon as the vehicle reaches such predetermined speed, thereby moving contacts 69 and 71 into engagement, closing the circuit to solenoid 73 and holding the same closed for all speeds above the chosen predetermined minimum speed of twelve miles per hour. Switch 64 is accordingly held in open position by armature 74 thus preventing the closing of the circuit through solenoid 21 of the power device 10, 11. When, however, pedal 54 is released, permitting the motor to idle and the vehicle to slow down to twelve miles per hour, the centrifugal forces tending to move dial 66 will become ineffective to hold lug 67 in engagement with finger 68. Spring 70 thereupon separates contacts 69 and 71 to de-energize solenoid 73 and permit spring 75 to close switch 64. Switch 60, 63 being already closed by release of pedal 54, the circuit is completed through solenoid 21 and power device 10, 11 is rendered operative to disengage the clutch.

Upon the energization of solenoid 21 in the above described manner, armature 24 will be raised, closing valve 25, and thus cutting off communication of chamber 35 above piston 10 with the atmosphere and at the same time opening valve 26 to place chamber 35 in communication with intake manifold 40 of the motor through passage 38. The suction of the motor creates a partial vacuum in chamber 35, causing cylinder 11 to be drawn downwardly, depressing clutch pedal 6 to release the clutch 4. Thus no foot operation of the clutch pedal is required by the operator, although he may depress pedal 6, at any time, with his foot to release the clutch if he wishes.

If the circuit through solenoid 21 is now broken at contacts 60, 63 by the depression of accelerator pedal 54, armature 24 drops under the action of spring 44, closing valve 26 to shut off communication of chamber 35 with the intake manifold, and opening valve 25 to place this chamber 35 in communication with the atmosphere through conduit 31. Thus, the vacuum in chamber 35 is partially destroyed, permitting cylinder 11 to move upwardly under the action of springs 5 and 51 to permit the clutch to engage. If, however, this cylinder was merely permitted to move rapidly upwardly without any control, the clutch would be engaged too rapidly causing a sudden jerking start of the car or stalling of the motor. To overcome this objection, there is provided an automatic control which so controls the upward movement of cylinder 11 and engagement of the clutch mechanism that the latter is engaged in a manner simulating expert foot operation.

For this latter purpose, passage 31 is in communication with passages 32 and 33 and a cross passage 76 (Figs. 2 and 3). Passages 32 and 76 are constantly in communication with the atmosphere through an opening 77 which is restricted by an adjustable needle valve 78 to restrict and regulate the entrance of air. The communication of passage 33 with passage 76 is restricted and controlled by an adjustable needle valve 79. Passage 33 is also in communication with the atmosphere through an opening 80, while passage 32 is in communication with the atmosphere through a similar opening 81. Openings 80 and 81 are controlled by movable valves 82 and 83 respectively, which latter are normally held from their seats by springs 84.

Valves 82 and 83 are mounted on supports pivoted at 85, each of said supports carrying a cam block. The support for valve 82 carries cam block 86, while the support for valve 83 carries cam block 87, said blocks cooperating respectively with springs 88 and 89 mounted on cylinder 11 or the holder 11' therefor for movement therewith. The outer surfaces of cams 86 and 87 may be made any shape desired to control the opening and closing of valves 82 and 83 as cylinder 11 moves upwardly carrying spring fingers 88 and 89 over the surfaces thereof. In the arrangement shown in Figs. 2 and 3, cam 87 has a straight outer wall 90 while cam 86 is stepped or recessed as shown at 91 and 92 to provide spaced cam surfaces 93 and 94. When finger 89 presses on cam surface 90, it will close valve 81, 83. When finger 88 presses on either cam surface 93 or 94, valve 80, 82 will be closed. At other times, the valves 82 and 83 will be held in open position by springs 84. Since cams 86 and 87 control the atmosphere inlet to power device 10, 11 and hence the upward movement of the clutch pedal, it will be seen that said cams may be so shaped as to control the engaging movement of the clutch to give ideal clutch engagement. Preferably, cams 86 and 87 are adjustably mounted on their supports so that they may be adjusted longitudinally thereof to vary the time of operation of valves 82 and 83. Such an adjustable mounting, with respect to the position of the driving surfaces of the clutch mechanism, may be a bolt 95 passing through elongated slots in the supports of the cams.

When valve 83 is open, it permits relatively free entrance of air into cylinder 11 through passages 32, 31, space 30, 21, valve 25, 27 and passages 36. With valve 83 closed and valve 82 open, the entrance of air into cylinder 11 is controlled by needle valves 78 and 79 which may be adjusted to restrict the entrance of air and causing a partial vacuum to thereby retard upward movement of pedal 54 and hence the engaging movement of the clutch driving surfaces. If both valves 82 and 83 are closed, the entrance of air is controlled and may be highly restricted by needle valve 78, in which event the vacuum resisting the relative movement of cylinder 11 and piston 10 is effective to further retard, or if desired to arrest, the movement of the clutch surfaces. Thus by proper shaping and adjustment of cam blocks 86 and 87, valve 82 and 83 may be operated to vary the rate of movement of cylinder 11 in any desired manner, and accordingly obtain ideal clutch engagement.

When the vehicle clutch is disengaged in the manner heretofore described, the power device 10, 11 assumes the dotted line position illustrated in Fig. 1, spring fingers 88 and 89 extending below the cam surfaces 90 and 94. When either of the switches 64 or 60, 63 is opened, spring 44 becomes effective to shift armature 24 to close valve 26 and open valve 25, thus admitting air through both valves 82 and 83 and the connecting passages to chamber 35 of cylinder 11. The vacuum in the latter being thus gradually destroyed, cylinder 11 begins to move upwardly at a comparatively rapid rate. As fingers 88 and 89 begin to ride up on the inclined surfaces 96 on the cams and start to close valves 82 and 83, the resistance to the movement of cylinder 11 is increased by the reduction of inflow of air, thereby retarding the movement of the clutch pedal. As fingers 88 and 89 ride onto cam surfaces 94 and 90, both valves 82 and 83 will be completely closed. This latter preferably occurs at the point at which the clutch surfaces start to engage. Since the only air that can now enter cylinder 11 must enter through opening 77 and past needle valve 78, the movement of the clutch pedal at this point will be very slow. This retarded movement of the clutch near the point of engagement of the driving surfaces permits the slow and gradual acceleration of the vehicle without jerking of the same. As momentum is gained and the clutch continues to move slowly into driving engagement, finger 88 rides off of surface 94 onto surface 92, thereby permitting the opening of valve 82, while valve 83 remains closed. This allows more air to enter cylinder 11 past the needle valve 79, thus permitting a somewhat more rapid engagement of the clutch while the vehicle picks up speed. With the further upward movement of cylinder 11, finger 88 begins to ride up the incline 97 to cam surface 93, again closing valve 82. This occurs preferably at the point at which the clutch is nearly fully engaged, said valve being momentarily kept closed to permit the vehicle to gain further momentum while the clutch is held nearly stationary. The clutch is fully engaged when both fingers 88 and 89 ride down off the surfaces of the cam blocks, permitting free entrance of air to chamber 35 and hence a relatively rapid movement of the clutch pedal to the limit of its upward movement. This latter movement is allowed to insure the full engagement of the clutch and to permit disengagement of the operating extension or fork 8 from the clutch collar 9 to prevent undue wear.

Thus in the engaging movement of the clutch, the initial movement is very rapid to quickly take up the lost motion so as to not delay starting and prevent racing of the engine through the operation of the accelerator pedal. At the point at which the clutch first begins to engage, the movement of the pedal and hence the clutch surfaces is substantially retarded to permit the clutch to take hold and start the vehicle with an easy, gradual movement without jumping or jerking. After the vehicle starts to move, the clutch is let in more rapidly for a short period to get a greater engagement and driving force, and then the pedal movement is held stationary for a short time while the vehicle gathers more speed, after which the clutch is let into full engagement and the remainder of the lost motion of the pedal is comparatively rapid. It will thus be apparent that the present device automatically controls the engaging movement of the clutch to provide clutch operation which is a duplicate of expert foot control so that no matter how inexperienced or inexpert the driver may be the clutch is always operated in the same ideal manner to start the vehicle without jumping or jerking. Excessive strains on the vehicle and tires and discomfort to occupants is accordingly eliminated. The device also prevents stalling of the motor, since the clutch is let in at the proper speed and eliminates racing of the motor such as might occur if the clutch is not engaged soon enough in foot operation.

In another embodiment of the invention, illustrated in Figs. 5 to 8 inclusive, novel means are provided whereby the power clutch actuating means are controlled by a speed responsive device in such a manner as to prevent operation of the vehicle beyond a predetermined maximum speed, which speed may be readily altered in accordance wtih the wishes of the driver. Signalling means are also provided in combination with said control means whereby audible or visual signals or both are operated at predetermined vehicle speeds to indicate to the driver or traffic officer when the vehicle is exceeding a certain predetermined speed.

In the form shown, said control and signaling means comprise the movable dial 98 of a speed responsive device similar to the speedometer shown in Fig. 4. Projecting from the periphery of said dial are a plurality of lugs 99 arranged at different heights and positions thereon corresponding to different speeds of the car and so arranged that under certain conditions they may engage a spring mounted contact 100 to move it into engagement with a similar contact 101, normally insulated from each other and mounted on an adjustable yoke 102 of a suitable insulating material. This yoke may be adjusted up and down by means of an eccentric 103 which may be turned to different positions by a key controlled barrel 104. The latter may carry a lock bolt 105 controlled by a key in an ordinary tumbler cylinder 106, and the position of barrel 104 may be determined by projecting the bolt 105 in any one of the plurality of recesses 107 located in the sleeve 108 surrounding barrel 104. Thus by turning barrel 104 and thereby turning the eccentric 103, yoke 102 may be raised or lowered, carrying with it contacts 100 and 101. Thus with yoke 102 in a given position, contact 100 will be engaged by one of the lugs 99 to close a circuit at the contacts 100 and 101 through solenoid 21 of the clutch operating power device and release the clutch when the vehicle reaches the predetermined speed determined by the setting of indicator dial 109. This circuit includes a pair of leads 110 and 111, preferably imbedded in yoke 102, the former connecting contact 100 with solenoid 21 and battery 65 and the latter connecting contact 101 to ground.

If, then, the position of yoke 102 corresponded to 45 miles an hour, the clutch would be automatically released through the energization of solenoid 21 when the car is operated at this speed. If the yoke were somewhat lowered by the rotation of cam 103, contact 100 would be engaged somewhat sooner by another lug 99 located lower on the dial and corresponding to a speed of, say, 35 miles an hour, so that in this position the clutch would be automatically released as soon as the car is driven at this speed, and so on for different speeds as desired. Thus the owner of the car can set this device by means of his key to prevent operation of the car beyond the predetermined maximum limit. Barrel 104 may be provided with a pointer 112 adapted to operate in conjunction with the indicating scale 109.

In order to prevent any racing of the motor when the clutch is disengaged, means may be provided whereby the throttle is moved to idling, or other selected position, at the same time the clutch is disengaged in the manner last above described. One form of device for attaining this result is illustrated in Figs. 1 and 4, wherein a solenoid 113, which may be connected in series with solenoid 21 (Fig. 5), is provided with an armature 114 connected through a lever 115 to throttle valve 56. Thus when the circuit is closed through solenoid 113 by the closure of switch 100, 101, armature 114 is attracted to the left and closes valve 56. In order that the throttle valve may also be controlled in the usual manner through accelerator pedal 54 and rod 55, and in order that said valve may be closed by the movement of armature 114 irrespective of the position of pedal 54, the latter is connected to valve 56 by means of a slip link. As shown, the slip link comprises a member 116 threadedly mounted on the lower end of rod 55 and provided with an elongated slot in which a pin 117 on a lever 118, connected to valve 56, is adapted to slide against the action of a spring 119. This spring is of sufficient strength to operate the throttle under normal foot operation of pedal 54 but is not sufficient to overcome the action of armature 114 to move to close said throttle when solenoid 113 is energized. A stop 120 may be provided for co-operating with the inner end of armature 114 to limit the closing movement of the throttle by solenoid 113. Armature 114 is preferably adjustably mounted on arm 115. It will thus be seen that when the circuit is closed to solenoids 21 and 113 by means of a speed responsive element 98, throttle 56 will be closed simultaneously with the disengagement of the clutch when a predetermined speed is reached or exceeded, and this irrespective of the position of accelerator pedal 54.

The signalling means provided in combination with the device of Fig. 5 are, in the illustrated embodiment, constituted by a contact 121 carried by yoke 102 and connected by lead 111 to contact 101. Contact 121 is adapted to move over and successively engage a series of spaced insulated contacts 122, 123, etc. Each of these contacts may be connected to a series of lights or other signals 124, 125, etc., which are in turn connected to ground. Thus when yoke 102 is in a position such as to bring contact 121 into engagement with contact 123, signals 125 will be energized as soon as the speed corresponding to this setting of yoke 102 is exceeded. This will indicate immediately to anyone within the car that the speed indicated by scale 109 is being exceeded. If desired, lights 124, 125, etc., corresponding to the various speed settings of the device, may be of different colors. Thus, for a low speed setting a blue light may be flashed, going through green and yellow and finally red as the maximum desired speed is attained. If desired, an additional switch control mechanism 98a may be mounted beneath dial 98 for controlling the above described signal system in order that such system may be rendered operable at different speeds and wholly independent of the operation of the clutch. Thus, control means 98a is operatively connected to contacts 100, 101 and lamps 124, 125 in a manner previously described, but said means has no operative connection with solenoid 21.

Another embodiment of the invention, whereby the clutch may be automatically released at a predetermined maximum speed of operation of the vehicle and whereby luminous indicating means keep the driver informed of the speed of the vehicle at all times, is illustrated in Figs. 9 to 12 inclusive. A novel centrifugal speed responsive device is shown, comprising a vertical shaft 126 rotatably supported in a hub portion 127 of housing 128, said shaft having a worm gear 129 mounted on the lower end thereof for rotation therewith and adapted to constantly engage a worm 130 on the propeller shaft 131 of the vehicle.

The upper end of hub portion 127 is provided with an annular flange 132 constituting a platform for a series of concentric contact strips or rings 133 embedded in a plate 134 of insulating material, said plate being secured by any suitable means such as bolts 135 to flange 132. The upper surfaces of rings 133 are preferably substantially flush with the upper surface of plate 134. Shaft 126 extends upwardly through a central opening in plate 134 and has a radially extending arm 136 formed integrally therewith. Pivotally mounted on a pin 139 at the outer bifurcated end of arm 136 is a substantially Y-shaped member 137 provided with a weighted portion 138 extending below said pivot. Member 137 extends inwardly above and adjacent to arm 136, the inner end of said member preferably terminating near the extended center line of shaft 126. A rod 140 is rigidly secured at one end to the upwardly extending outer leg 141 of member 137 and extends inwardly through and beyond the other leg 142 of said member.

Slidably mounted on rod 140 is a tubular member or sleeve 143 which extends through leg 142 and is provided at one end with an adjustable nut 144 and at the other end with a flange 145. A comparatively heavy roller 146 is loosely mounted on sleeve 143 between flange 145 and leg 142, the center of gravity of said roller being thus radially spaced from the center of rotation of shaft 126 and accordingly responsive to centrifugal force when rotated with said shaft. For yieldably resisting the outward movement of roller 146 on rod 140, a spring 147 is interposed between leg 142 and nut 144. Spring 147 normally holds roller 146 in the position shown in Fig. 9, in which position said roller rides on an upwardly extending annular flange 148 on plate 134 surrounding the center opening in the latter.

Thus when the vehicle is moving, shaft 126 will be driven from drive shaft 131, thereby rotating the entire assembly, comprising arm 136, member 137, weight 138 and roller 146, at a rate directly proportional to the speed of the vehicle. During such rotation, roller 146 is moved outwardly along rod 140 by centrifugal action and out of contact with flange 148. Weight 138 is likewise thrown outwardly by centrifugal action, thus tending to pivot member 137 in a counterclockwise direction about pivot 139, as seen in Fig. 9, and thereby holding roller 146 in firm engagement with contact rings 133. For the purpose of closing circuits to luminous signals and the power clutch actuator, as will hereinafter appear, the movement of roller 146 along rod 140 will bear a definite relation to the speed of rotation of drive shaft 131 and hence the speed of the vehicle. The extent of radial movement of roller 146 under centrifugal action for a given vehicle speed may be regulated by adjusting the tension of spring 147 by means of nut 144.

For the purpose of indicating the vehicle speed to the driver at all times, a plurality of leads 149 connects each of the rings 133 through a cable 150 to one terminal of each of a series of bulbs 151 (Fig. 10) suitably mounted in a partitioned housing 152, the other terminal of each bulb being connected through a battery 65 to ground. The circuits to said bulbs are completed through roller 146 which is connected to ground through the vehicle chassis. The front plate or face of housing 152 is provided with suitable openings such as numbers cut therein to indicate progressive speeds of the vehicle, there being one number or speed corresponding to each compartment of said housing. The inner ring 133 on plate 134 (Fig. 9) is connected to the bulb illuminating the number 15, the next ring to a bulb for illuminating the number 25, etc.

In the illustrated embodiment, therefore, spring 147 is so calibrated, and the mass of roller 146 is so proportioned, that said roller will engage the inner or first ring 133 when the speed of the vehicle attains a speed of 15 miles per hour. A circuit is at that time closed by the engagement of roller 146 with the inner ring 133, and the indicating number 15 (Fig. 10) will be illuminated. As the speed approaches 25 miles per hour, the roller engages the second ring, closing a circuit for illuminating the number 25 on housing 152, and as the speed further increases, said roller progressively engages the other rings to progressively light the indicating bulbs in said housing. Preferably, roller 146 is wide enough to engage two of the rings 133 simultaneously to thus illuminate two numbers on housing 152 and indicate the range of speed within which the vehicle is operating.

In Figs. 11 and 12, a novel switch is illustrated which may be employed with the speed responsive device of Fig. 9 to control the speed at which the clutch power device heretofore described is rendered operative to automatically disengage the clutch and prevent operation of the vehicle. Said switch means in the form shown are constituted by an insulating block 153 supported in housing 154 and having a plurality of spring contacts 155 secured thereto in spaced relation on the periphery thereof, which contacts are adapted to normally engage a contact segment 156 also secured to the periphery of block 153. Each of the spring contacts 155 is connected by a lead through cable 150 to a ring 133 (Fig. 9), the contact corresponding to 15 miles per hour being connected to the inner ring and so on. Contact segment 156 is connected by a lead 157 to solenoid 21 of the power device 10, 11, said solenoid in turn being connected to battery 65. For the purpose of regulating the vehicle speed at which a circuit will be closed through solenoid 21 and the clutch disengaged, a segmental plate 158, having a radius slightly greater than the radial distance from the center of block 153 to the extended ends of spring contacts 155, is mounted on a rotatable bolt 159 extending centrally through said block. A handle 160 is secured to the forward end of bolt 159 for rotating the latter with plate 158, whereupon said plate is adapted to successively engage springs 155 adjacent the extended ends thereof, moving the same out of contact with contact ring 156.

In operation, if plate 158 is in the position shown, a circuit will be completed through solenoid 21 as soon as the vehicle reaches a speed of 15 miles per hour, i. e. when roller 146 engages the inside ring 133 (Fig. 9), and the lower right-hand contact 155, as seen in Fig. 12, is in engagement with contact segment 156. If it is desired to prevent operation of the vehicle only after it has attained a speed of, say 45 miles an hour, i. e. a speed at which roller 146 engages the middle contact ring 133, which is connected by lead 149 to the center contact 155 in Fig. 12, handle 160 is turned in a clockwise direction until plate 158 engages the first three springs 155 (at the left in Fig. 12), lifting the same out of engagement with contact ring 156. A circuit to solenoid 21 cannot then be closed until a speed of 45 miles an hour is attained, i. e. the speed at which roller 146 will engage the center contact ring 133. To prevent clutch disengagement until a higher speed is attained, it is only necessary to further rotate handle 160 in a clockwise direction. A scale may be provided on the face of casing 154 which cooperates with said handle to indicate the speed at which the device is set for automatic clutch disengagement.

If desired, a manually operable switch may be included in the various circuits above described, either to render the clutch operating power device 10, 11 inoperative when said switch is in open position when connected in series with solenoid 21, as is switch 161 in Fig. 4, or to render said power device operative irrespective of the speed responsive means when said switch, such as switch 162 in Fig. 11, which is connected in parallel with solenoid 21, is closed.

There is thus provided novel means including a novel speed responsive device for controlling the power operation of the clutch mechanism of a motor vehicle whereby the clutch may be automatically engaged or disengaged at a predetermined vehicle speed, said means being operative either to prevent operation of the vehicle above a predetermined maximum speed or to prevent automatic disengagement of the clutch when the vehicle is operating above a predetermined speed. Novel means are also provided whereby the throttle of the vehicle motor may be automatically moved to idling or other suitable position simultaneously with the disengagement of the clutch mechanism. Novel signaling means, employed in combination with the clutch control means whereby either visual or audible signals inform the driver of the speed of the vehicle at all times or at any pre-selected speeds, is also provided.

Although only a limited number of embodiments of the invention have been illustrated and described, it is to be expressly understood that the same is not limited thereto but that various changes may be made in the mechanical details as well as the design and arrangement of parts illustrated without departing from the spirit and scope of the invention. For example, the speed responsive device of Fig. 9 may be substituted for that shown in Figs. 4 and 5 by merely connecting lead 72 or contacts 122, 123, etc. to the proper contact rings 133. Reference will, therefore, be had primarily to the appended claims for a definition of the limits of the invention.

What is claimed is:

1. In apparatus of the class described, a driving member, a driven member, clutch means for drivably connecting said driving and driven members, a fluid pressure motor for disengaging said clutch means, means responsive to the speed of said driven member for controlling said fluid pressure motor, and means responsive to the movement of said clutch means for varying the resistance of said fluid pressure motor to the engaging movement of said clutch means.

2. In an automotive vehicle, an engine, a drive shaft, clutch means for drivably connecting said engine and shaft, fluid pressure means for actuating said clutch means, and means responsive to the speed of the vehicle for controlling said fluid pressure means, whereby said fluid pressure means is effective to actuate said clutch means to disconnect said engine and shaft at a predetermined maximum vehicle speed.

3. In an automotive vehicle provided with an internal combustion engine, a throttle for said engine, accelerator pedal controlled linkage for operating said throttle, a drive shaft and a clutch adapted to interconnect said engine and shaft, means for operating said clutch comprising a pressure differential operated motor, a control valve for said motor, said valve being rendered operative by the actuation of said pedal, and speed responsive means, rendered operative by said engine and drive shaft, for controlling the operation of said valve.

4. In an automotive vehicle having an engine, a throttle for said engine, a drive shaft, and clutch means for drivably connecting said engine and shaft, vacuum actuated means connected with said engine for releasing said clutch, means responsive to the speed of the vehicle for controlling said vacuum actuated means to disengage said clutch at a predetermined speed, and means controlled by said speed responsive means for actuating said throttle when the clutch is disengaged.

5. In apparatus of the class described, an engine, a driven member, clutch means for drivably connecting said engine and member, power means for disengaging said clutch means, electrical means for indicating the speed of said member and for controlling said power means to disengage said clutch means at a predetermined speed indication, and centrifugal means actuated by said member for controlling said electrical means comprising a shaft adapted to be rotated by said member, a weight mounted on said shaft and responsive to said centrifugal force when the shaft rotates, and yielding means resisting radial movement of said weight by said centrifugal force, and contact strips engageable by said weight to close circuits to said indicating means.

6. In an automotive vehicle, a shaft rotated at a speed proportional to the speed of the vehicle, a contact member operatively connected to said shaft to revolve around the center of rotation of said shaft and adapted to move radially therefrom under action, yielding means resisting the radial movement of said contact member, electrical indicating means, and circuits for said indicating means adapted to be successively closed by said contact member as the latter is moved radially from the center of rotation of said shaft during rotation of the latter.

7. In an automotive vehicle, centrifugal means responsive to the speed of the vehicle comprising a slidably mounted member adapted to be moved radially outward from a center of revolution by centrifugal force, and yielding means for moving said member radially inward, and a plurality of circuits including indicating means adapted to be successively closed as said member moves radially to and from said center of rotation, whereby the speed of said vehicle is indicated.

8. In an automotive vehicle having an engine and a drive shaft, means for drivably connecting said engine and shaft to propel said vehicle, means controlled in accordance with the speed of the vehicle to render said first named means inoperative to drivably connect said engine and shaft, and speed responsive means for rendering said second named means inoperative to disconnect said engine and shaft at predetermined vehicle speeds.

9. In an automotive vehicle having an engine, a clutch and a drive shaft, fluid pressure actuated means for releasing said clutch, means responsive to the speed of the vehicle for controlling said fluid pressure actuated means whereby said clutch may be automatically released by said last named means at a predetermined vehicle speed, and means including a lock and removable key for determining the vehicle speed at which said speed responsive means renders said fluid pressure means operative to disengage the clutch.

10. In an automotive vehicle having an engine, a drive shaft, and a clutch for drivably connecting said engine and shaft, a power device operably connected to said clutch for releasing the same, means connecting said power device to a source of sub-atmospheric pressure, means associated with said power device for varying the resistance thereof to the engaging movement of the clutch, and speed responsive means for controlling the operation of said power device.

11. In an automotive vehicle, an engine, a drive shaft drivably connected to the wheels of the vehicle, clutch means for drivably connecting said engine and said drive shaft, a fluid pressure operated power device connected to the clutch means and capable of releasing the same, means for connecting the power device to a source of sub-atmospheric pressure, and means including speed responsive means for controlling said connection, said power device comprising means for varying the resistance to the engaging movement of the clutch.

12. In an automotive vehicle, an engine, a drive shaft drivably connected to the wheels of the vehicle, a clutch for drivably connecting said engine and said drive shaft, a suction operated power device connected to the clutch and capable of releasing it, means for connecting the power device with the intake manifold of the engine, and means including means responsive to the speed of the vehicle for controlling said connection, said power device comprising means for varying the resistance to the engaging movement of the clutch.

13. In an automotive vehicle, an engine, a drive shaft drivably connected to the wheels of the vehicle, clutch means for drivably connecting said engine and said drive shaft, a power device connected to the clutch means and capable of releasing the same, a control device for the power device to cause it to function to release the clutch means, means responsive to the speed of the vehicle for controlling said device, and means controlled by movement of the clutch means for varying the resistance to the engaging movement of the clutch means.

CHARLES A. BREWER.